UNITED STATES PATENT OFFICE.

J. T. TROTTER, OF NEW YORK, N. Y.

IMPROVEMENT IN MANUFACTURE OF INDIA-RUBBER.

Specification forming part of Letters Patent No. 7,880, dated January 1, 1851.

*To all whom it may concern:*

Be it known that I, JONATHAN T. TROTTER, of the city, county, and State of New York, have invented a new and useful and Improved Process for Curing or Preparing or Vulcanizing India-Rubber; and I do hereby declare the following to be a full and exact description of the same.

The nature of my invention consists in the new and useful manner in which I prepare the rubber by means of an article or preparation of zinc. The process for preparing the said zinc article is as follows:

In a solution of caustic lime, potash, or any other caustic alkali I boil flowers of sulphur till the liquor is completely saturated. In making this lye I have the alkali always in excess. After the boiling of the liquor it is removed from the fire and allowed to stand and cool, when any excess of sulphur in the liquor settles to the bottom, leaving a clear sulphureted-potash solution. This clear liquor is then decanted into another vessel, in which is a concentrated solution of the sulphate of zinc. On the mixture of these two solutions a decomposition takes place, and the zinc is precipitated in the form of a white powder, which may be called a "bisulphuret of zinc," or artificial preparation of zinc of similar characteristics chemically combined. When the zinc has all been precipitated it is collected and washed and filtered, and then exposed to dry, after which it is ground in an ordinary grinding-mill till it becomes an impalpable powder. It is in this state mixed and ground with the india-rubber, in the ordinary mills used for that purpose, in the proportion of about four pounds of the preparation of zinc to about ten pounds of the rubber, and the composition, after being subjected to a heat for about three to five hours to a temperature of 250° to 280° Fahrenheit, according to the thickness of the material and the purposes to which it is to be applied, is found to be completely cured or vulcanized, and without the use of free raw sulphur in any way in combination with the rubber.

As a new and useful compound material for curing india-rubber, it is superior to all other known processes, except my hyposulphite-of-zinc process, which formed a part of the series of experiments resulting in this improvement. It has none of the offensiveness of sulphur goods, because raw sulphur is not used in any way in combination with the rubber. In consequence of this disuse of raw sulphur in any way with the rubber, they never have to be boiled in a potash liquor, as all other rubber-cured goods have to be. The advantage of this is that the texture of the rubber is not affected; second, my process admits of making up on all kinds of fancy silk or woolen fabrics, while with other curing processes animal textile fabrics and fancy-colored goods would be destroyed by the alkali-boiling process, which lasts from four to six hours; third, my process saves time and labor in curing rubber by the sulphur process. After coming from the potash-boiling they require to be sun-dried, artificial heat not being sufficient to remove the peculiar sticky or clammy feeling about them. This sun-drying takes several days when not good drying-weather and never less than two days. Other advantages could be enumerated, but deem it not necessary, sufficient having been pointed out to show the value and importance of my improved process of curing rubber, samples of which accompany this specification.

Having described my improved process for curing rubber, I will state what I claim and desire to secure by Letters Patent.

What I claim, therefore, is—

The use and employment of zinc, substantially as prepared by the process above described, in combination with india-rubber, for the purpose of curing or vulcanizing it, in form and manner as herein set forth, without the use of free sulphur in any way in combination with the rubber.

JONA. T. TROTTER.

Witnesses:
CHARLES L. BARRITT,
JOHN STURGES.